United States Patent
Varun Mukesh et al.

(10) Patent No.: US 11,063,927 B1
(45) Date of Patent: Jul. 13, 2021

(54) IDENTITY-AWARE APPLICATION LOAD BALANCER

(71) Applicant: Amazon Technologies, Inc., Seattle, WA (US)

(72) Inventors: Lodaya Varun Mukesh, Mill Creek, WA (US); Hamza Muhammad Arain, Bellevue, WA (US); Anurag Sanjay Katey, Seattle, WA (US); Jing Gao, Seattle, WA (US); Alexander Ray Curtis, Seattle, WA (US); Oleg Mitrofanov, Seattle, WA (US); Prerna Rustagi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 453 days.

(21) Appl. No.: 15/969,085

(22) Filed: May 2, 2018

(51) Int. Cl.
*H04L 29/06* (2006.01)
*H04L 29/08* (2006.01)

(52) U.S. Cl.
CPC ........ *H04L 63/0815* (2013.01); *H04L 67/146* (2013.01)

(58) Field of Classification Search
CPC ........ G06F 21/31; G06F 21/33; G06F 21/335; G06F 21/30; H04L 63/08; H04L 63/0807; H04L 63/0815; H04L 63/0823; H04L 63/0884; H04L 63/0892
See application file for complete search history.

(56) References Cited

U.S. PATENT DOCUMENTS

| | | | |
|---|---|---|---|
| 2012/0023568 A1* | 1/2012 | Cha | H04L 63/0807 726/10 |
| 2012/0144034 A1* | 6/2012 | McCarty | H04L 67/16 709/225 |

* cited by examiner

*Primary Examiner* — Edward Zee
(74) *Attorney, Agent, or Firm* — Nicholson De Vos Webster & Elliott LLP (57) ABSTRACT

Techniques for an identity-aware load balancer (ALB) are described. An identity-aware ALB can securely authenticate users when accessing web-based applications accessed through the ALB, or a node of the ALB. An application owner can configure an authentication action in the ALB. When a request for the application is received, the ALB inspects the request for a session cookie to determine whether the requesting user is logged-in. If the request includes a session cookie, the ALB can decrypt the session cookie and provide identity information with the request to the application. If no session cookie is included, or if the session cookie is expired, the ALB can authenticate the user with an identity provider specified in the authentication action. Integrating authentication into an ALB simplifies application development and maintenance, and improves security, since fewer changes to the application stack reduce the chances of errors being introduced.

17 Claims, 8 Drawing Sheets

```
                        300
                         ⌒
       ┌─────────────────────────────────────────────────────┐
       │ SessionCookie {                                     │
 302 ⌒─┤  "user_claims": "<claims>",                         │
       │                                                     │
 304 ⌒─┤  "user_identity": "<sub field received in user claims>" │
       │                                                     │
 306 ⌒─┤  "access_token": "<access_token>",                  │
       │                                                     │
 308 ⌒─┤  "token_expiry": <configured SessionTimeout>,       │
       │                                                     │
 310 ⌒─┤  "ap_id": "<access_point_id>"                       │
       │                                                     │
 312 ⌒─┤  "last_access_time": <timestamp>                    │
       │ }                                                   │
       └─────────────────────────────────────────────────────┘
```

```
aws elbv2 create-rule --listener-arn <listener_arn> --priority 10 --
conditions
Field=path-pattern,Values='/oldpage'
--actions '[{"Type": "authenticate-oidc", "OIDCAuthenticateConfig": {
  "Issuer": "Issuer URI",
  "AuthorizationEndpoint": "Auth Endpoint URI",
  "TokenEndPoint": "Token Endpoint URI",
  "UserinfoEndpoint": "User Info Endpoint URI",
  "ClientID": "Public Identifier",
  "ClientSecret": "Private Key",
  "SessionCookieName: "Name",
  "Scope": "[One or more user claims]",
  "SessionTimeout": [time period],
  "Logout_URI": "IdP Logout URI",
  "AuthenticationRequestExtraParams": {
       "display": "page",
       "prompt": "login"
  },
  "OnUnauthenticatedRequest": <"authenticate"/"allow"/"deny">
}, "Order": "1"]
```

402 → "Issuer"
404 → "AuthorizationEndpoint"
406 → "TokenEndPoint"
408 → "UserinfoEndpoint"
410 → "ClientID"
412 → "ClientSecret"
414 → "SessionCookieName"
416 → "Scope"
418 → "SessionTimeout"
420 → "Logout_URI"
422 → "AuthenticationRequestExtraParams"
424 → "OnUnauthenticatedRequest"

426

```
$ aws elbv2 create-rule \
--listener-arn arn:aws:elasticloadbalancing:uswest-
2:123456789012:listener/app/my-load-balancer/50dc6c495c0c9188
/f2f7dc8efc522ab2 \
--priority 10 --conditions Field=path-pattern,Values='/oldpage' \
--actions '[
{
  "Type": "authenticate-cognito",
  "AuthenticateCognitoConfig": {
    "UserPoolArn": "arn:aws:cognito-idp:useast-
1:494948918771:userpool/us-east-1_RsMXqMlXW",
    "UserPoolClientId": "abcdefghijklmnopqrstuvwxyz123456789",
    "UserPoolDomain": "curtisaltest"
  },
  "Order": 1
},
{
  "Type": "forward",
  "TargetGroupArn": "arn:aws:elasticloadbalancing:useast-
1:494948918771:targetgroup/tg2/8940c304570e75ad",
  "Order": 2
}]'
```

428 → "UserPoolArn"
430 → "UserPoolClientId"
432 → "UserPoolDomain"

RECEIVING, BY AN IDENTITY-AWARE LOAD BALANCER, A REQUEST DESTINED TO A FIRST APPLICATION OF ONE OR MORE APPLICATIONS, THE IDENTITY-AWARE LOAD BALANCER MANAGING TRAFFIC FOR THE ONE OR MORE APPLICATIONS 502

↓

INSPECTING THE REQUEST TO DETERMINE WHETHER THE REQUEST INCLUDES A SESSION COOKIE, THE SESSION COOKIE REPRESENTING AN AUTHENTICATED STATE OF A USER, THE AUTHENTICATED STATE OF THE USER DETERMINED BY AN IDENTITY PROVIDER AND RECEIVED BY THE IDENTITY-AWARE LOAD BALANCER 504

↓

PROCESSING THE REQUEST BASED ON THE AUTHENTICATED STATE OF THE USER 506

IDENTITY-AWARE APPLICATION LOAD BALANCER

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which.

DETAILED DESCRIPTION

Various embodiments of methods, apparatus, systems, and non-transitory computer-readable storage media for an identity-aware application load balancer are described. Identity federation shares a user's digital identity across multiple platforms, which eliminates the need for users to remember and provide multiple credentials. To provide identity federation, application developers implement various identity federation standards such as Security Assertion Markup Language (SAML) and OAuth2 based OpenID Connect. This requires developers to understand different standards and enable communication with various identity provider (IDP) endpoints. With the rise of distributed micro service-based architecture, this becomes more challenging as application owners have to either write code to talk to these endpoints on each server or build a central stack. Since an application load balancer (ALB) can frontend multiple back-end applications, embodiments enable the ALB to act as Identity-aware Proxy (IAP) that can communicate with IDP endpoints and authenticate browser requests made to the web applications.

Embodiments provide an ALB which can securely authenticate users when accessing web-based applications. Previously, customers developed custom authentication functionality and integrated it into their application stack. However, this requires that any change needed for authentication function also requires changes to the application stack. Integrating authentication into an ALB simplifies application development and maintenance. Additionally, offloading authentication to the ALB improves security, since fewer changes to the application stack reduce the chances of errors being introduced.

Figure 1:
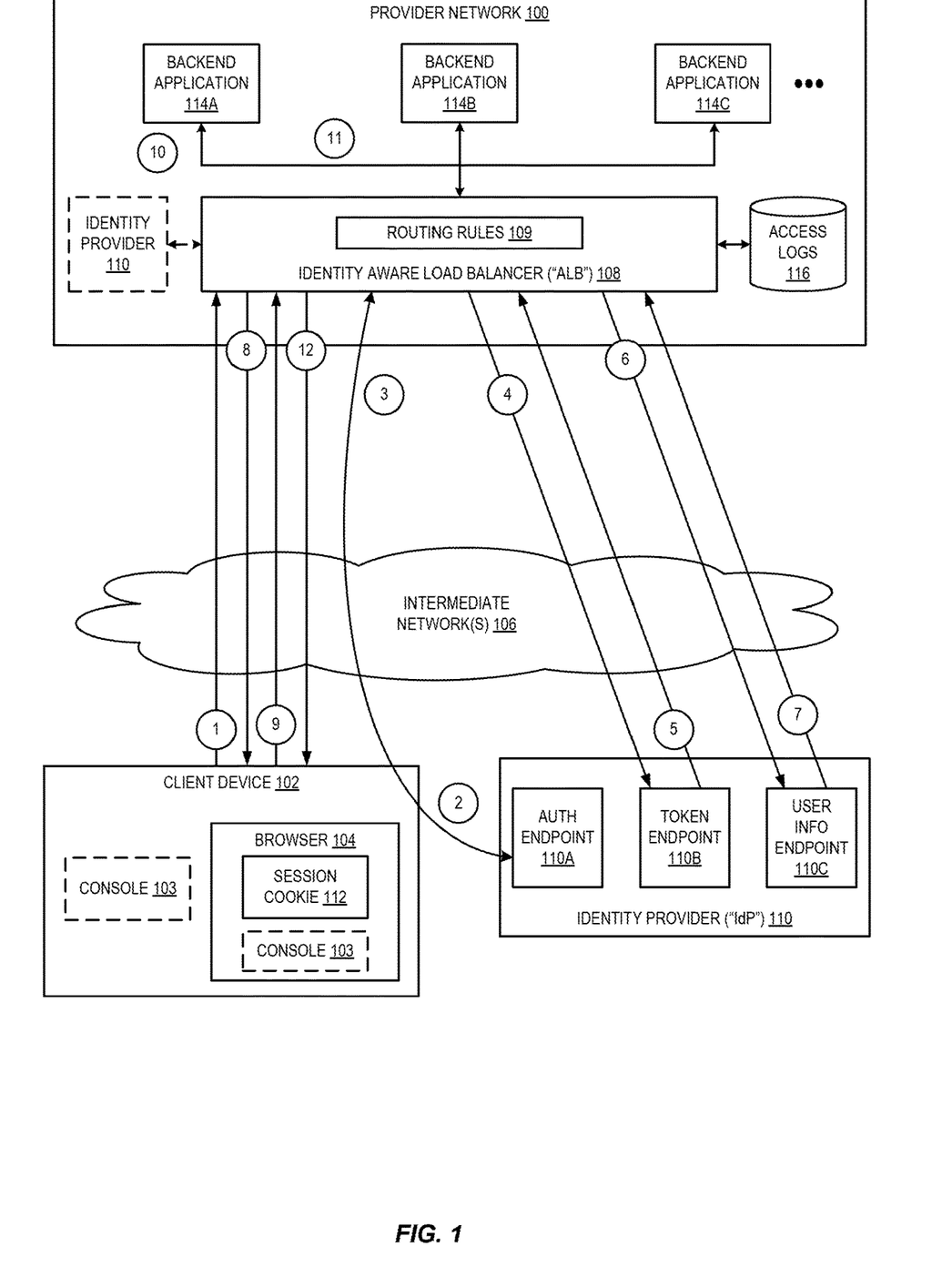
FIG. 1 is a diagram illustrating an environment for an identity-aware application load balancer according to some embodiments.

FIG. 1 is a diagram illustrating an environment for an identity-aware application load balancer according to some embodiments. A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage), network-related resources (e.g., configuring virtual networks including groups of compute resources, content delivery networks (CDNs), Domain Name Service (DNS)), application resources (e.g., databases, application build/deployment services), etc. These and other computing resources may be provided as services, such as a hardware virtualization service that can execute compute instances, a storage virtualization service that can store data objects, etc. The users (or "customers") of provider networks 100 may utilize one or more user accounts that are associated with a customer account, though these terms may be used somewhat interchangeably depend ending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

As shown in FIG. 1, a user can access provider network 100 using client device 102. Client device 102 may include a console 103 and browser 104. In some embodiments, the console may be provided by provider network 100 and accessed through browser 104. At numeral 1, a user can utilize client device 102 to send a request to provider network 100 to access one or more backend applications 114A-114C. The request may be received by identity-aware application load balancer (ALB) 108. ALB 108 can be configured to authenticate users with an identity provider (IdP) 110, such as any Open ID Connect (OIDC) compliant IdP, which may be located outside the provider network 100 or implemented within the provider network 100. The IdP can be used by the ALB to securely authenticate users on behalf of applications 114A-114C accessed through the ALB. In various embodiments, the ALB can integrate with social IdPs, such as those available from Google Inc., Facebook Inc., Twitter Inc., etc. Additionally, or alternatively, corporate identity stores, such as active directory or Lightweight Directory Access Protocol (LDAP) identity store that supports SAML and OAuth protocols, may also be used. In some embodiments, different types of users can be configured to be authenticated by different IdPs; for example, employees can be authenticated using one IdP, while partners and visitors can be authenticated using a different IdP.

When the request is received by the ALB, the ALB can determine whether the request includes a session cookie. At numeral 2, if the user is not authenticated (e.g., if the request does not include a session cookie or ID token), the user can be redirected a login page of an identity provider (IdP) 110 that displays sign-in options. An IdP provides flexibility to manage user identities in a logically central place and authenticate the credentials supplied by the user when accessing applications that are federated by the IdP. In some embodiments, each IdP can connect to an identity store (e.g., Active Directory, LDAP, Google ID, Facebook ID, etc.). The IdP can accept an authentication request from any federated backend application 114. The IdP can then authenticate the user and assert the identity according to a standard, such as a SAML assertion or OpenID-Token. IdPs can also audit the authentication session to ensure security.

In some embodiments, an application developer can define an authentication action to be performed by the ALB 108. The authentication action can be defined for a requested Uniform Resource Identifier (URI)—e.g., a Uniform Resource Locator (URL), such that the authentication action is performed by the ALB when the URI is requested. The URI may correspond to the backend application. The authentication action definition may include one or more of an authorization endpoint 110a, a token endpoint 110b, a user information endpoint 110C, and a session cookie name. The application (e.g., by the entity that runs or operates the application) can be registered with a given IdP. When the application is registered with the IdP, the IdP provides the application (or a user, administrator, or other entity operating the application) with application credentials for the application. The application credentials are used when by the application to authenticate a user with the IdP. Because authentication has been offloaded to the ALB, the application can provide its application credentials to the ALB as part of the authentication action definition. This enables the ALB to perform authentication on behalf of the application with the IdP. The authentication action may be implemented using an HTTPS (or HyperText Transfer Protocol (HTTP) Secure) listener. The redirect can be to the authorization endpoint 110A. In some embodiments, the ALB can add a state variable to the request when redirecting. The state variable can be encrypted and can include information that can be used by the ALB to identify the original request (e.g., to associate the redirect with the original request). The state variable may include the authentication type, a rule priority, and a target uniform resource identifier (e.g., the original URI of the application the user requested). The ALB can also set a redirect URI to which the request should be redirected following authentication.

In some embodiments, the sign-in options can be those that have been selected by the application. At numeral 3, upon successful authentication, the user is redirected back to the application using the redirect URI. If the user is already authenticated (e.g., the authenticated user is accessing a different application through the same ALB), then the user can receive access without additional authentication required. Similarly, if an authenticated user accesses an application before a configurable time period has expired, the authenticated user can continue accessing the application without requiring additional authentication. If the configurable time period has expired, the user can be redirected again to the IdP for authentication.

At numeral 4, the ALB can request an ID token for the user from the token endpoint 110B. In some embodiments, the request is a POST HTTP request message sent to the token endpoint 110B, which may include a code received from the authorization endpoint 110A following the successful login of the user. In some embodiments, the code is included as an additional query string parameter. While the request is sent, the ALB can hold the main request in memory. At numeral 5, the token endpoint 110B can respond to the ALB with a token. The ALB can validate the token. In some embodiments, validation includes one or more of comparing the "iss" (or "issuer") field in the token to ensure that it matches the identity of the configured token issuer, checking the "iat" (or "issued at") time to validate that the token was not issued more than a configurable time period ago, and/or checking the "exp" (or "expiry/expiration") time to confirm that the token is still valid and not expired.

At numeral 6, the ALB can send a request for user claims using the token. User claims may include statements made about the user by the user, the IdP, the application, or other entity. The claims may include statements related to the user's name, identity, groups, privileges, accounts, etc. The request can be sent to the user information endpoint 110C and can include the token. In some embodiments, the request can be an HTTP GET request message which may include the token, e.g., in the Authorization Header Field. At numeral 7, the user info endpoint 110C can send a message returning the user claims to the ALB. By retrieving and including the user claims with the request, the application is provided with authentication information with which the application can determine whether to authorize the user (e.g., to access the application and/or to perform specific actions with the application).

Using the received user claims, in some embodiments the ALB adds the claims to a session cookie that can be added/updated to the original user request (or, e.g., an ALB-generated request carrying the payload of the original request). Thus, at numeral 8, the session cookie can be sent to the client device 102 and the client device can be redirected at numeral 9 back to the backend application 114 that was originally requested. In some embodiments, a new request including the same or similar information as the original request and the session cookie can be created and sent to the backend application. As discussed, the original URI may be saved by the ALB 108 (e.g., in the state variable) when the request was redirected to the authorization endpoint 110A. When the user is redirected to the backend application 114, the session cookie can be included in a request header. Upon receiving the redirect with the session cookie, the ALB can decrypt the cookie, validate the cookie, and check if the cookie is expired. If both checks pass, the ALB marks the cookie as a valid cookie and can add three new fields to the HTTP Headers of the request before forwarding the request on to the backend application. These fields can include, for example, a "UserClaims" field to carry the user claims (obtained from the user info endpoint 110C), a "UserIdentity" field to carry a user identifier or name, which may be a subset of the user claims, and an "AccessToken" field to carry the token (obtained at token endpoint 110B). At numeral 10, the redirected request can be sent to the backend application 114A that was originally requested. At numeral 11, the backend application can respond to the request. At numeral 12, the ALB 108 can return the response to the client device 102.

As discussed, the user claims obtained from the user information endpoint can be used by the backend applications to perform authentication and authorization on the user. In some embodiments, the ALB can sign the user claims so that the backend applications can ensure the user claims are trusted. For example, the backend applications can verify the signature of the ALB and validate that the claims have been provided by the ALB and not a malicious actor. In some embodiments, the ALB can generate new HTTP headers to pass user identity to the backend applications. These headers may include an ID token header which includes the ID token received from the token endpoint in clear text, a user identity header which may include the user's "sub" field (e.g., an identifier associated with the user being authenticated) in clear text, and a user information header that includes the user claims. The user information header may include the user claims in a JSON web token (JWT) format which includes the claims and a signature. The backend applications can verify the signature using a public key. The public key may be looked up using a key identifier that is included in the new headers.

In some embodiments, to encrypt the session cookie, the ALB uses a pre-created private key (e.g., an RSA 2048 or Elliptic Curve Digital Signature Algorithm (ECDSA) 256 private key). The keys may be regional and rotated over a configurable time period. For further requests from the same client, ALB can thus decrypt and read the cookie as long as the expiration time for the session is not violated. Once the client device has the session cookie, subsequent requests to the backend application 114A, or other backend applications 114 managed by the same load balancer 108 can be processed without additional authentication, unless the session cookie has expired or if the user has logged out of the session.

In some embodiments, ALB 108 supports content-based routing using routing rules 109. Each rule may include conditions and actions that can be configured by customers to define logic that decides which application server the requests should be routed to and under what condition(s). Authentication may also be configured using the content-based routing rules, for example a rule may include an "Auth" action which specifies one or more applications and a "forward" action to forward the authenticated request to a target. For example, to invoke an Auth request for a given URL path, then the rule may be defined as IF URL path THEN Auth(authorization parameters) and forward(target group), where the target group may be one or more specific instances or IP addresses of the application being requested.

The ALB 108 does not have to receive or store any user credentials. Instead, the session cookie stores the authenticated state of the user. Each backend application 114 can communicate directly with IdP 110 (e.g., any OIDC compliant provider) to authenticate users. As discussed, when the user is authenticated by IdP 110, a token can be received by the ALB and used to determine if the user is authenticated or not. Based on the token, the ALB stores the authenticated state (e.g., the token, expiration time, etc.) in the encrypted session cookie and forwards the session cookie to the requested backend application. The backend application forwards the encrypted session cookie to the client from where the request originated.

By offloading authentication to the ALB 108, the ALB can support single sign-on by federating identities. A user that is logged into any backend application 114 deployed behind ALB 108, may access other backend applications 114 without requiring additional authentication. Although the ALB may redirect a subsequent request for a different backend application to the IdP 110, the IdP recognizes that the session cookie (e.g., based on the user ID in the session cookie) is already authenticated and does not prompt the user to enter their user credentials. In some embodiments, the ALB may generate access logs 116 which include one or more of the identity of each authenticated client, including a user identifier and application identifier.

In some embodiments, an administrator can configure the authentication settings in the ALB through console 103 and/or browser 104, including an issuer of the IdP which may include a URI of a location of the IdP. These may include the IdP's authorization endpoint, token endpoint, and user endpoint. The configuration settings may also include a ClientID, which may include a public ID of the client, and a ClientSecret, which may include a private key of the client. In some embodiments, a cookie name may be provided for the session cookie to store the ID token. Additionally, in some embodiments, the identity scope can be configured which determines which parts of the user's identity are requested from the IdP, such as phone number, email, and Active Directory group of the user. In some embodiments, additional parameters may be included, such as a key, value pair which can be used when calling authorization endpoints.

By configuring the session cookie names, the application owner can enable global and/or selective logout for the applications. For example, if the session cookie for each application is given the same name, then when the user logs out of one application, the session cookie is invalidated logging the user out of every application. However, if each application has a session cookie with a different name, then logging out of one application does not affect the session cookies associated with the other applications. Likewise, subsets of backend applications may be associated with a session cookie having the same name. For example, backend applications 114A and 114B may be associated with a first session cookie name, and backend application 114C may be associated with a second session cookie name. If the user logs out of backend applications 114A, then the user is also logged out of backend application 114B as the same session cookie is invalidated. However, the user is not logged out of backend application 114C, because it is associated with the second session cookie name.

Figure 2:
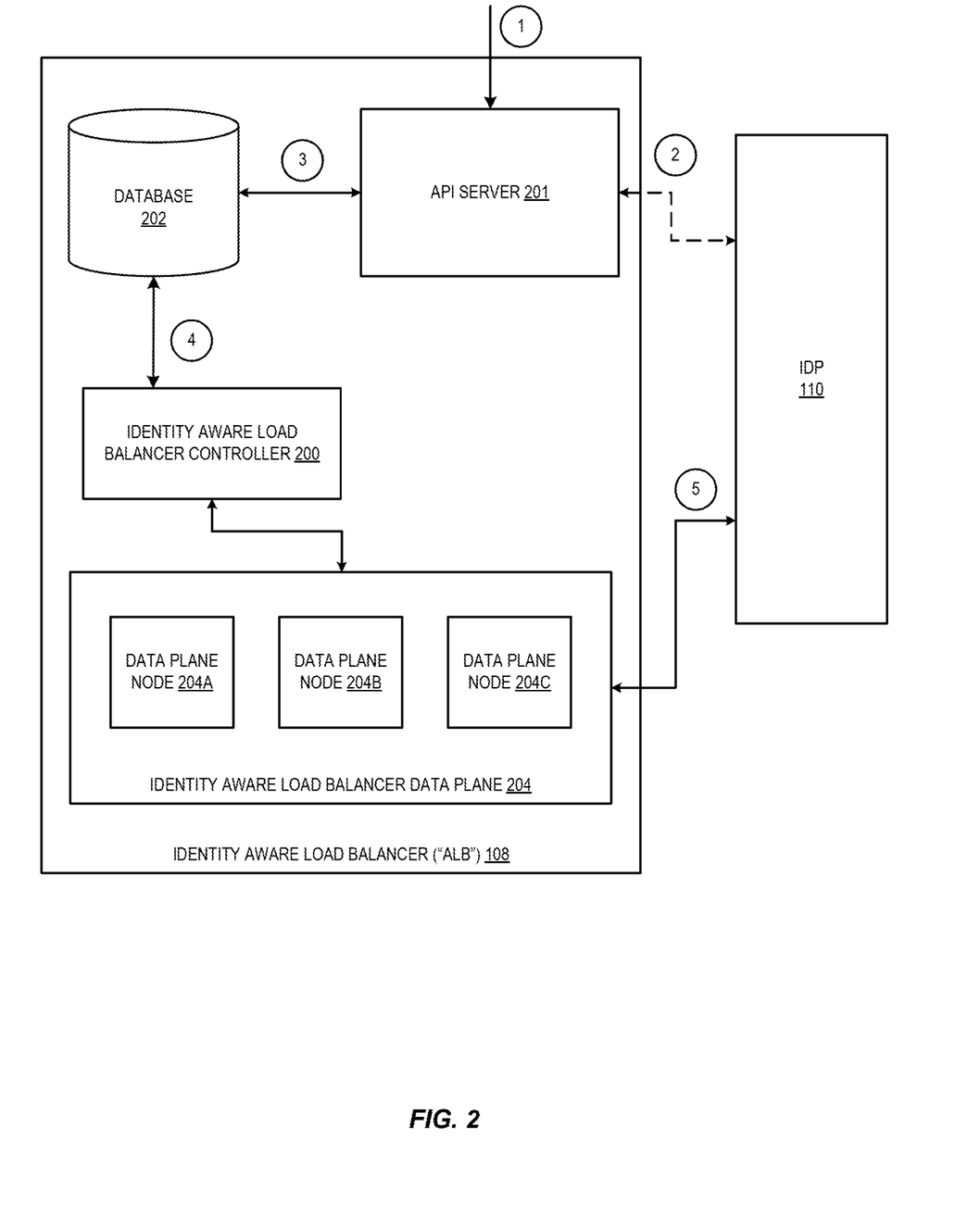
FIG. 2 is a diagram illustrating an environment for an identity-aware application load balancer controller and data plane according to some embodiments.

FIG. 2 is a diagram illustrating an environment for an identity-aware application load balancer controller and data plane according to some embodiments. An identity-aware load balancer controller 200 can be configured to provide the authentication action. When a user configures an authentication action, at numeral 1 the configuration information can be received by API server 201. As discussed, in some embodiments, the configuration information can include an authorization endpoint, a token endpoint, a user information endpoint, and a session cookie name. In such embodiments, this configuration information can be passed directly to database 202 at numeral 3. Additionally, or alternatively, in some embodiments, the configuration information may include an issuer URI, client identifier, client secret, scope, and timeout period. At numeral 2, the issuer URI can be used to request the authorization endpoint, token endpoint, and user information endpoint from the IdP 110.

The configuration information, received numeral 1 and/or retrieved from IDP 110 at numeral 2, may then be validated by the API server 201 and stored to database 202 at numeral 3. At numeral 4, the controller 200 can pull the configuration information from the database 202, and at numeral 5 the controller 200 can push the configuration information to ALB data plane nodes 204. Each data plane node 204 can then manage authentication requests using the configuration information. At numeral 5, each data plane node 204 can connect to the IdP endpoints to perform authentication as requests from users are received.

As shown in FIG. 2, a load balancer may include multiple data plane nodes 204. Each node can be configured to decrypt session cookies received with requests. As such, the authenticated state of a given request is accessible to the load balancer, regardless of which node receives the request. In some embodiment, decryption keys can be shared across the nodes such that any node can decrypt the session cookies received with requests. In some embodiments, multiple load balancers may be in use and a session cookie encrypted by one load balancer may not be readable by a different load balancer. Accordingly, in some embodiments, each session cookie can be associated with a load balancer identifier.

When the session cookie is received, the associated load balancer identifier can be read and used to determine which load balancer is to process the request. If the request is received by a load balancer that is not associated with the load balancer identifier, the request can be forwarded to the load balancer corresponding to the identifier.

Figure 3:
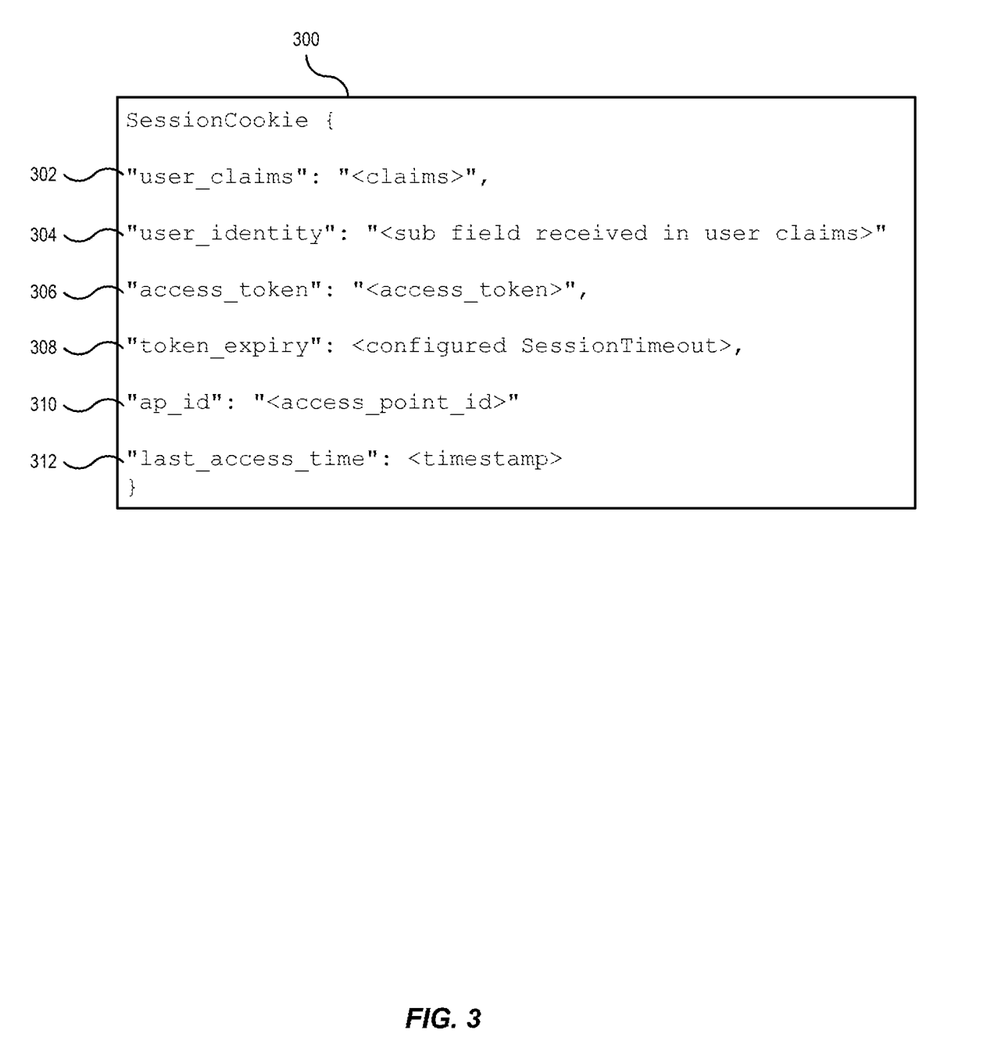
FIG. 3 is a diagram illustrating an example session cookie used by an identity-aware application load balancer according to some embodiments.

FIG. 3 is a diagram illustrating an example session cookie 300 used by an identity-aware application load balancer according to some embodiments. As discussed above, session cookie 300 represents the authenticated state of a user. The session cookie can include various fields associated with this state (also referred to as authentication information). In some embodiments, the session cookie 300 includes user claims 302. The user claims convey the identity and authorization details of the user and the permission the user has to access resources. For example, the claims can include groups to which the user belongs, applications the user can access, email ID of the user, contact number etc. The session cookie 300 may also include a field for user identity. User identity 304 may be a subfield of the user claims, such as the user's name or other identifier. The session cookie may include an access token 306. As discussed above, the access token may be received from the token endpoint in response to receipt of a code provided by the authorization endpoint following a successful login. The session cookie may include a token expiry 308 which corresponds to a time period by the IdP, the backend application, an administrator, or other entity. In some embodiments, the session cookie includes an access point identifier 310. In some embodiments, the session cookie can include a last access time 312. This field can be updated each time a user sends a request. If the last access time exceeds a configurable time period, then the ALB can log out the user due to inactivity.

Figure 4:
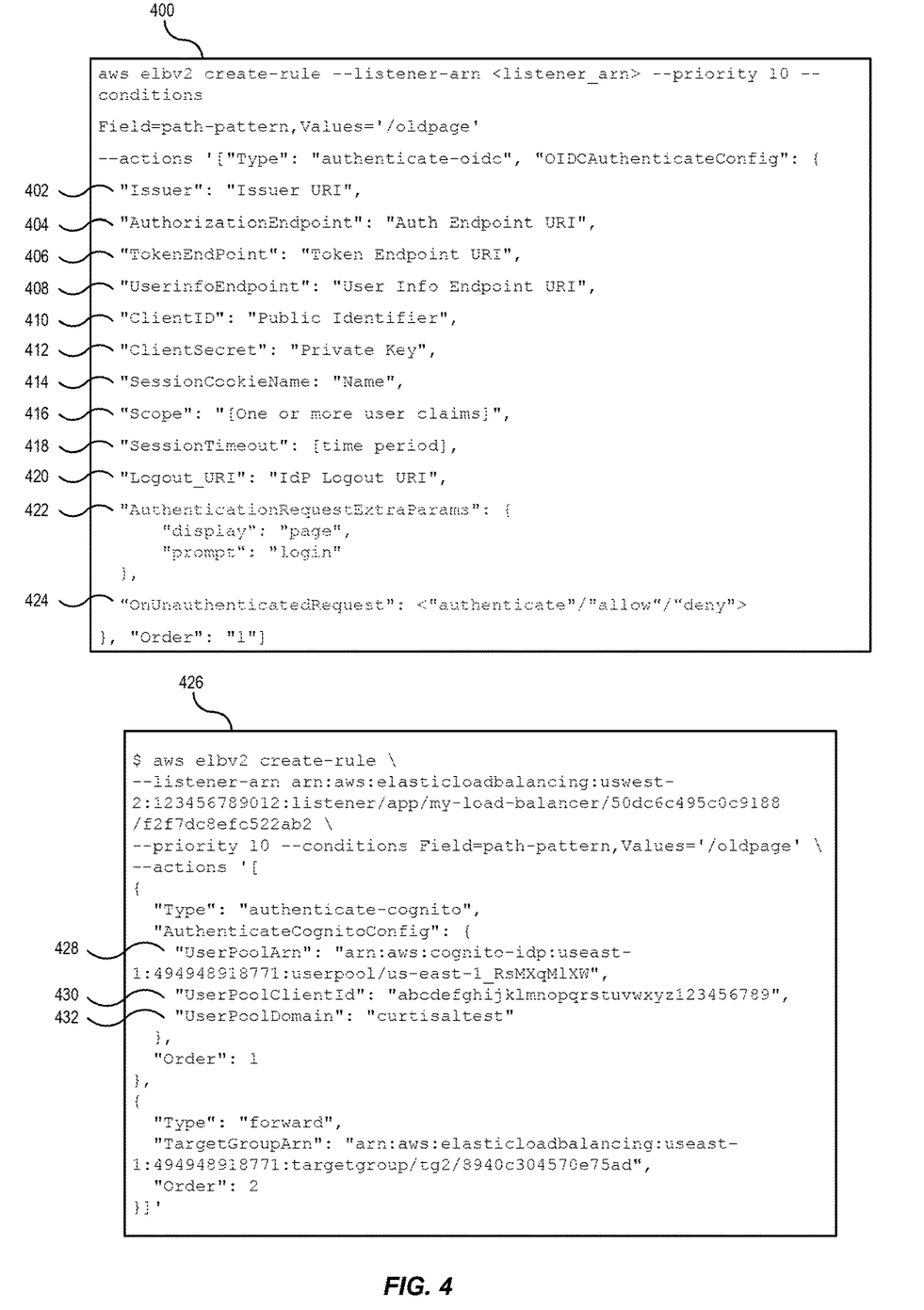
FIG. 4 is a diagram illustrating example application programming interfaces (APIs) for an identity-aware application load balancer according to some embodiments.

FIG. 4 is a diagram illustrating an example application programming interface (APIs) for an identity-aware application load balancer according to some embodiments. As shown in FIG. 4, a user can create an authentication action using the example API. To define the authentication action using API 400, the user can provider an issuer 402 of the IdP. The issuer 402 may be the URI of the location of the IdP. This may correspond to the location of Well_known_config_path for the IdP, through which the URIs of the auth_endpoint 404, token_endpoint 406, and user_info endpoint 408 can be requested. In some embodiments, the API can validate that the endpoints 402-408 are HTTPS endpoints.

As shown in FIG. 4, API 400 can include a ClientID 410 and ClientSecret 412. The ClientID and ClientSecret can be assigned to the application by the IdP, when the application registers with the IdP. As discussed, the ClientID and ClientSecret are the application credentials for the IdP. These are provided to the ALB using the API to enable the ALB to perform authentication with the IdP on behalf of the application. API 400 may also include a SessionCookieName 414. As discussed, the session cookie name enables the application owner to enable global and/or selective logout for the applications. Additionally, the API 400 may include Scope 416 which specifies what part of the user's identity in the IdP are requested, such as phone number, email, Active Directory group of the user, etc. In some embodiments, a session timeout 418 may also be defined, which determines how long the session cookie is active before it expires. The session timeout time controls how long a user can use the session cookie to access the backend application. In some embodiments, this field may be optional and, if not specified, may default to a default time period (e.g., one day, one week, etc.). Once the time period has elapsed the token can be expired regardless of user activity and on the next access attempt the user may be redirected to the authentication endpoint as discussed above. In some embodiments, a Logout URI field 420 can define an IdP logout URI. To log out the user, the ADP can expire the session cookie and redirect the user's request to the specified logout URI. The IdP can then perform its logout flow to logout the user.

In some embodiments, API 400 can include authentication request extra parameters 422. Extra parameters can enable various functionalities in different IdPs. The authentication request extra parameters 422 can include key value pairs provided by the user which then may be used by the IdP. For example, a refresh token may be obtained to enable the ALB to issue a new access token or ID token without having to reauthenticate the user. The refresh token can be used by the ALB until it is revoked by the IdP. To obtain the refresh token, extra parameters can be included in the authentication configuration using the authentication request extra parameters field 422. Depending on the IdP, these extra parameters may include "prompt": "consent", and "access_type": "offline". The refresh token may then be used to obtain a new ID token when the previous ID token has expired. For example, if the session cookie is not expired (e.g., based on the session timeout time discussed above), but the ID token has expired, the refresh token can be included in a request to the token endpoint to obtain a new ID token. In some embodiments, the new ID token may then be used to obtain updated user claims from the user information endpoint. The session cookie can then be updated to include the new ID token and updated claims. The updated session cookie may still be configured to expire at the same time as that of the older cookie. In addition to refresh token functionality, various key value pairs may be provided to enable different functionality by different IdPs.

In some embodiments, API 400 can include an on unauthenticated request field 424. This field may define one or more rules to be performed upon receiving an unauthenticated request, the possible values may include Authenticate (default value), Allow, or Deny. If the value is set to authenticate, then the authentication flow described above can be performed on the user. If the value is set to allow, the request can be passed to the backend application but without any authentication information. For example, a backend application may provide a public view which does not require authentication to be requested and a private view that requires authentication. By setting the value to allow, any unauthenticated requests that are received can first be provided the public view, without requiring authentication. If the value is set to deny, then the request can be blocked by the ALB from reaching the backend application. Following a timeout, or other logout event, this may prevent some features of an application from attempting to refresh data from the backend application which the user is no longer logged in to view.

As discussed, in some embodiments, the ALB may be configured to perform authentication through an identity management system, such as Amazon Cognito®. API 426 shows one such example of integrating with an identity management system. The authentication configuration information may vary from that described above with respect to API 400. For example, the authentication configuration may include a user pool identifier 428 which corresponds to a user directory in the identity management system. The authentication configuration may also include a user pool client ID 430 corresponding to a public identifier for the user pool client, and a user pool domain 432. The data in these fields of the authentication configuration may be used to request the IdP endpoints from the identity management system. The IdP endpoints may then be used as described above to perform authentication of users requesting access to the backend applications.

Figure 5:
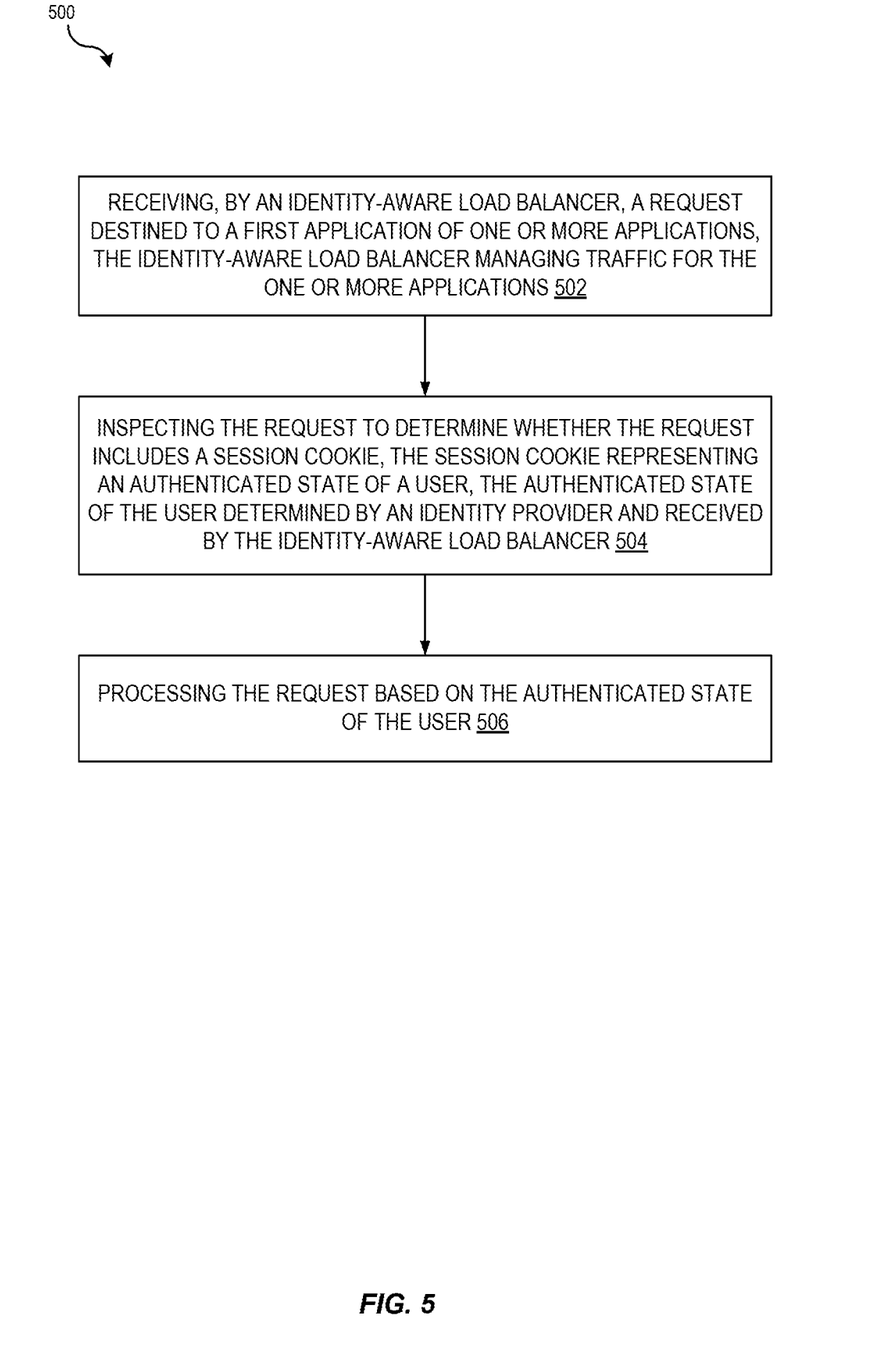
FIG. 5 is a flow diagram illustrating operations for identity-aware application load balancing according to some embodiments.

FIG. 5 is a flow diagram illustrating operations 500 for identity-aware application load balancing according to some embodiments. Some or all of the operations 1000 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by identity-aware load balancer 108 of the other figures.

The operations 500 include, at block 502, receiving, by an identity-aware load balancer, a request destined to a first application of one or more applications, the identity-aware load balancer managing traffic for the one or more applications. In some embodiments, the identity-aware load balancer comprises a plurality of nodes, each node of the plurality of nodes configured to decrypt the session cookie to retrieve authentication information associated with the user. The session cookie can include a load balancer identifier such that if the request is received by a different load balancer it is forwarded to the identity-aware load balancer for processing.

The operations 500 include, at block 504, inspecting the request to determine whether the request includes a session cookie, the session cookie representing an authenticated state of a user, the authenticated state of the user determined by an identity provider and received by the identity-aware load balancer. The authentication configuration includes an issuer URI, an authorization endpoint URI, a token endpoint URI, a user information endpoint URI, and application credentials for the identity provider. The first application is registered with the identity provider and receives the application credentials from the identity provider. In some embodiments, the authentication configuration further includes a session cookie name. The session cookie name is associated with the first application and a second application and upon logging out, a client device of the user can be redirected to a logout URI, the session cookie can be invalidated, and the user is logged out of the first application and the second application.

The operations 500 include, at block 506, processing the request based on the authenticated state of the user. In some embodiments, processing can include decrypting the session cookie, determining the session cookie is valid, and sending the request to the first application. In some embodiments, processing can include determining the session cookie is expired and sending a request to an identity provider to authenticate the user, the request to the identity provider generated using an authentication configuration associated with the first application. Authentication information for the user can be received in response from the identity provider and a new session cookie can be generated including the authentication information. A client device associated with the user can then be redirected to resend the request to the first application including the session cookie. In some embodiments, the processing can include determining the request does not include the session cookie and sending a request to an identity provider to authenticate the user, the request to the identity provider generated using an authentication configuration associated with the first application. Authentication information for the user can be received from the identity provider and the session cookie can be generated including the authentication information. A client device associated with the user can then be redirected to resend the request to the first application including the session cookie.

In some embodiments, an identity-aware load balancer, can receive an authentication configuration, the authentication configuration including identity provider endpoint URIs, the authentication configuration associated with an application, the identity-aware load balancer managing traffic for the application. The identity-aware load balancer can receive a request for the application from a client device and determine the user is not authenticated. The identity-aware load balancer can send a request to the identity provider using the authentication configuration and receive in response authentication information for the user from the identity provider. Using the authentication information, the identity-aware load balancer can generate a session cookie including the authentication information and send the request to the application. The session cookie can be added to the request by the identity-aware load balancer. The application can send the session cookie to the client device, and the client device includes the session cookie with subsequent requests. In some embodiments, the identity-aware load balancer can receive a second request from the client device for the application, the second request including the session cookie, determine the session cookie is valid, and send the second request to the application.

Figure 6:
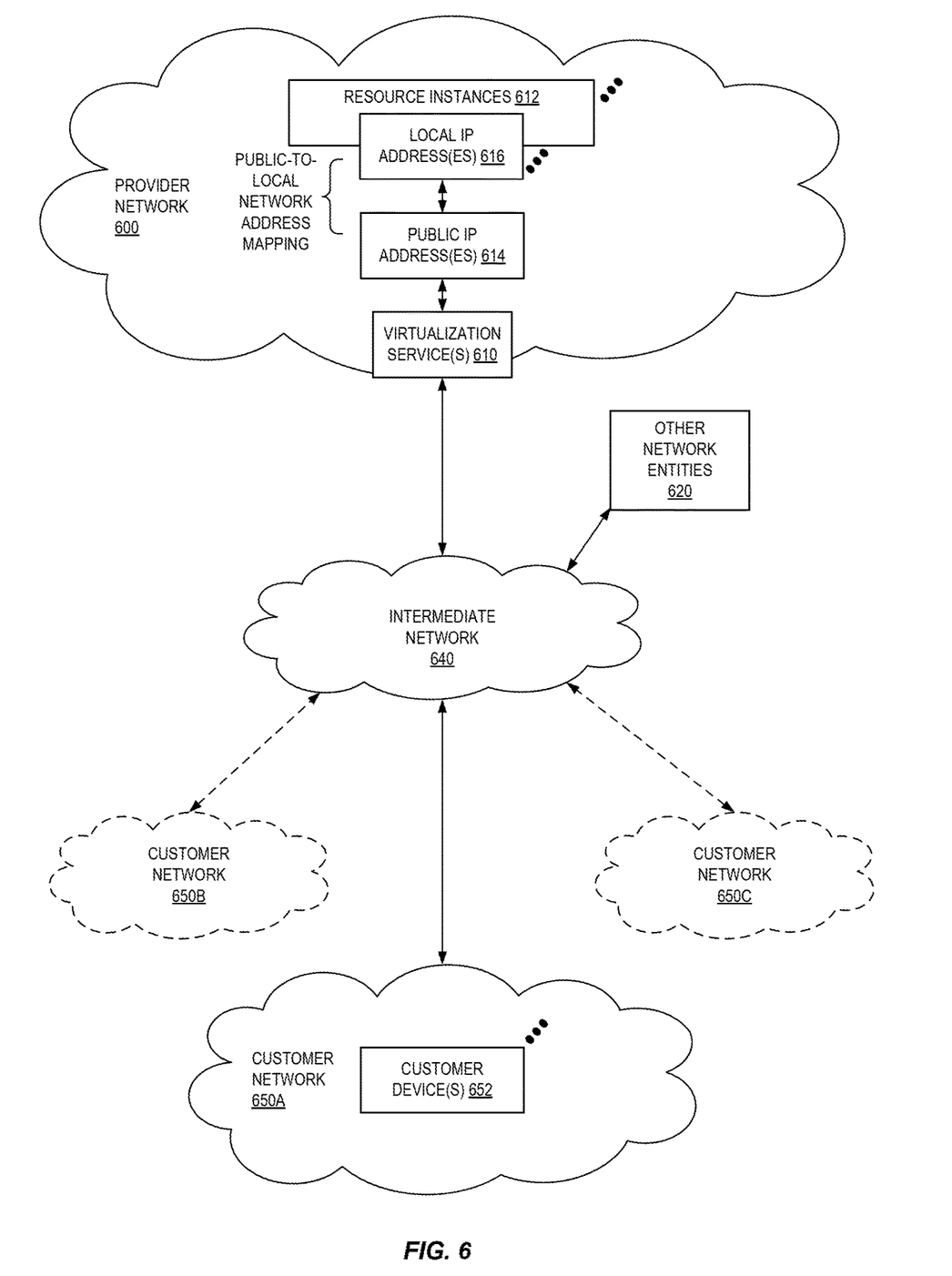
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local IP addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
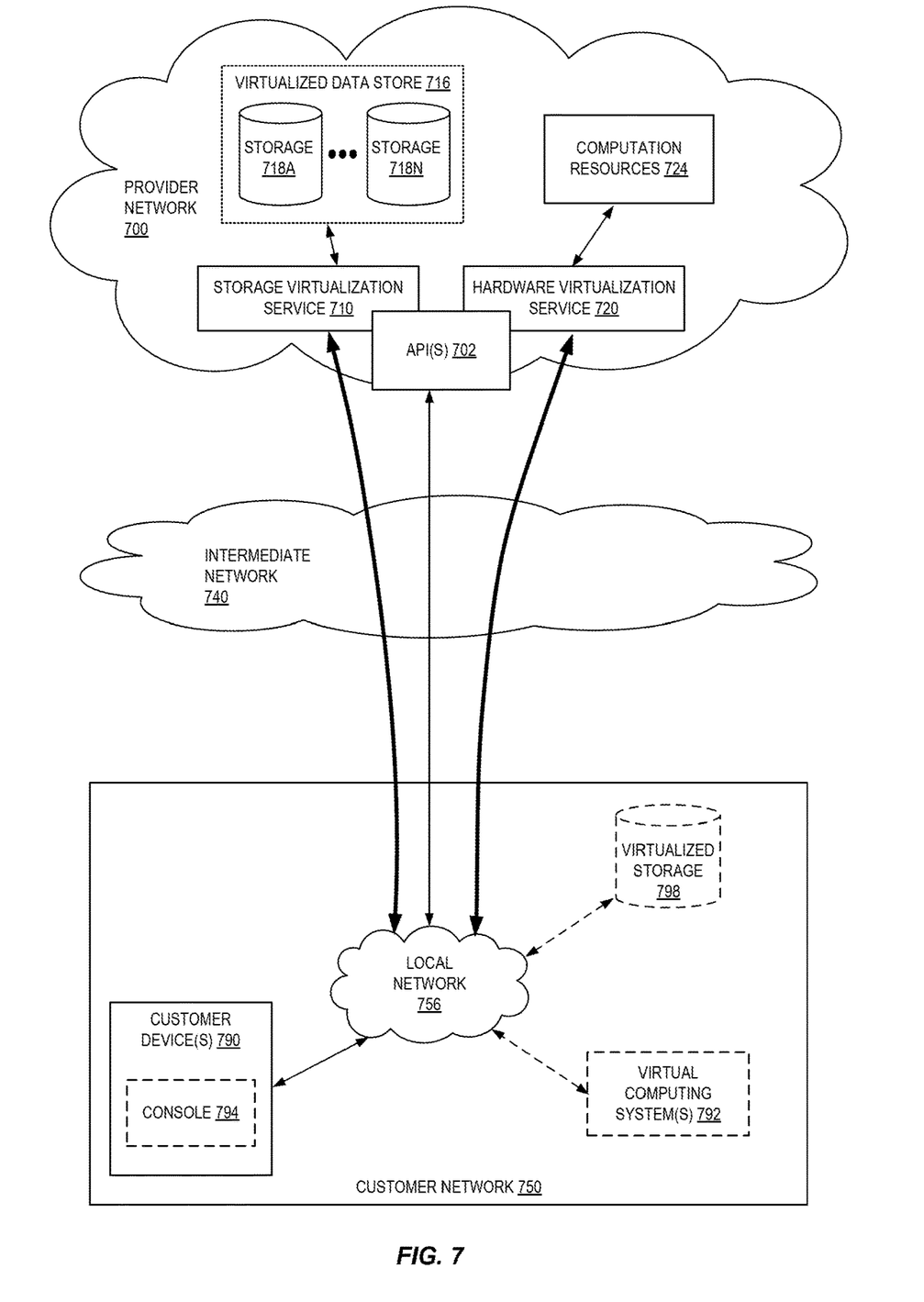
FIG. 7 is a block diagram of an example provider network that provides a storage virtualization service and a hardware virtualization service to customers according to some embodiments.

FIG. 7 is a block diagram of an example provider network that provides a storage virtualization service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage virtualization service 710, for example via one or more APIs 702, to access data from and store data to storage resources 718A-718N of a virtual data store 716 provided by the provider network 700. In some embodiments, a virtualized data store gateway (not shown) may be provided at the customer network 750 that may locally cache at least some data, for example frequently accessed or critical data, and that may communicate with virtualized data store service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes, which appear to the user as local virtualized storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative System

Figure 8:
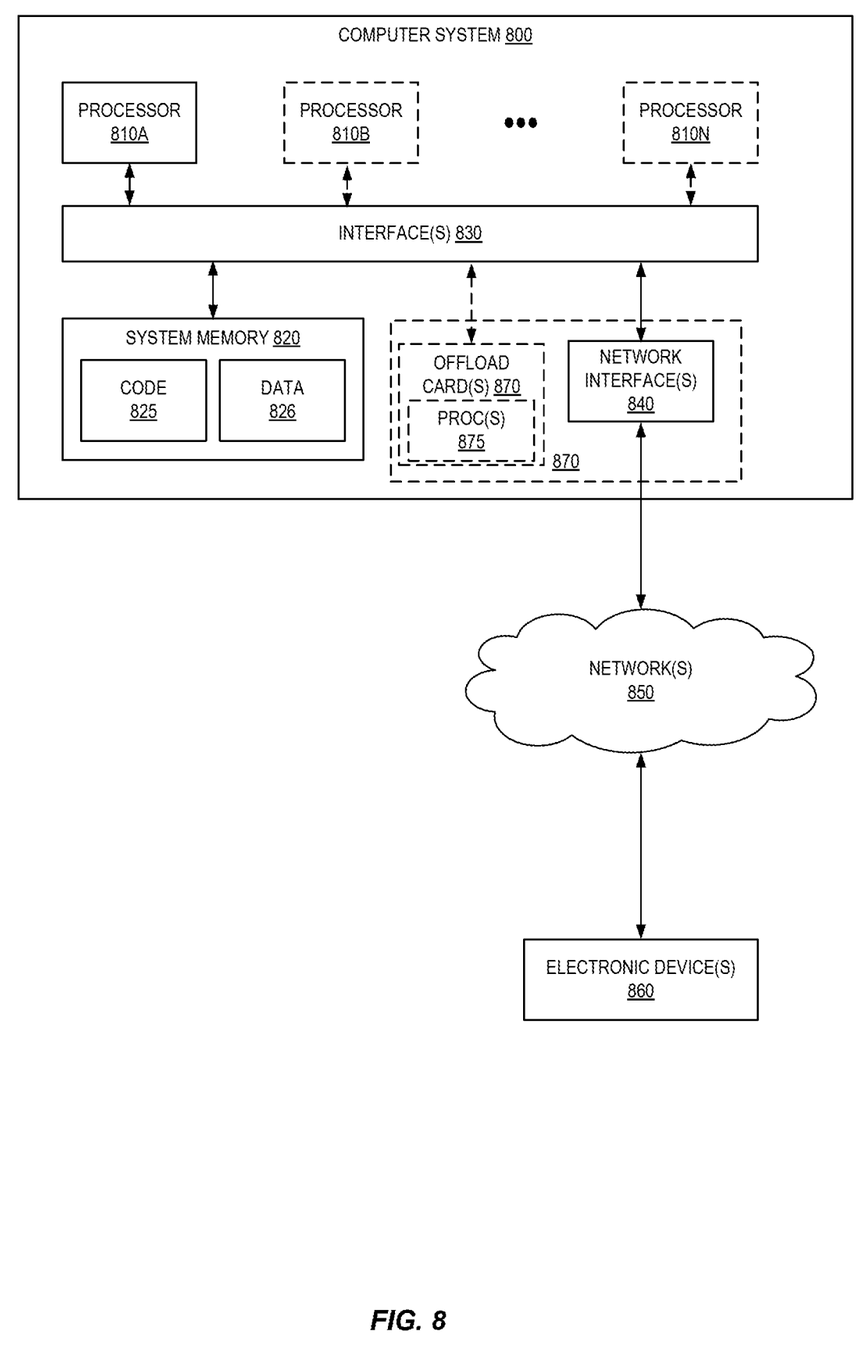
FIG. 8 is a block diagram illustrating an example computer system that may be used in some embodiments.

In some embodiments, a system that implements a portion or all of the techniques for providing an identity-aware application load balancer as described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 820 as code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 110A-C, 114A-C, etc.) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    receiving, by an identity-aware load balancer, an authentication configuration comprising an identifier of identity provider endpoints, the authentication configuration associated with an application, the identity-aware load balancer managing traffic for the application;
    receiving, by the identity-aware load balancer, a request destined to the application that was originated by a client device of a user;
    determining, based on the request, that the user is not authenticated;
    sending a request to the identity provider endpoints using the authentication configuration;
    receiving authentication information for the user from the identity provider;
    generating a session cookie based on the authentication information, wherein the identity-aware load balancer sends the session cookie to the client device, and wherein the client device includes the session cookie with subsequent requests; and
    redirecting the client device to resend the request to the application including the session cookie.

2. The computer-implemented method of claim 1, further comprising:
    receiving a second request from the client device for the application, the second request including the session cookie;
    determining the session cookie is valid; and
    sending the second request to the application.

3. A computer-implemented method comprising:
    receiving, by an identity-aware load balancer, a request destined to a first application of one or more applications, the identity-aware load balancer managing traffic for the one or more applications;
    inspecting the request to determine whether the request includes a session cookie, the session cookie representing an authenticated state of a user, the authenticated state of the user determined by an identity provider and received by the identity-aware load balancer;
    determining the request does not include the session cookie;

sending a request to the identity provider to authenticate the user, the request to the identity provider generated using an authentication configuration associated with the first application;

receiving authentication information for the user from the identity provider;

generating the session cookie including the authentication information;

redirecting a client device to resend the request to the first application including the session cookie; and processing the request based on the authenticated state of the user.

4. The computer-implemented method of claim 3, wherein processing the request based on the authenticated state of the user further comprises:

decrypting the session cookie;

determining the session cookie is valid; and sending the request to the first application.

5. The computer-implemented method of claim 3, wherein processing the request based on the authenticated state of the user further comprises:

determining the session cookie is expired;

sending a request to the identity provider to authenticate the user, the request to the identity provider generated using an authentication configuration associated with the first application;

receiving authentication information for the user from the identity provider;

generating a new session cookie including the authentication information; and redirecting a client device to resend the request to the first application including the session cookie.

6. The computer-implemented method of claim 3, wherein the authentication configuration includes an issuer URI, an authorization endpoint URI, a token endpoint URI, a user information endpoint URI, and application credentials for the identity provider.

7. The computer-implemented method of claim 6, wherein the authentication configuration further includes at least one of a logout URI, authentication request extra parameters, or an on unauthenticated request field.

8. The computer-implemented method of claim 7, wherein the authentication configuration further includes a session cookie name, wherein the session cookie name is associated with the first application and a second application, and wherein logging out of the first application causes a client device of the user to be redirected to the logout URI, the session cookie to be invalidated, and the user logged out of the first application and the second application.

9. The computer-implemented method of claim 3, wherein processing the request based on the authenticated state of the user further comprises:

processing the request by a first node of the identity-aware load balancer, the identity-aware load balancer comprising a plurality of nodes;

decrypting the session cookie by the first node;

retrieving authentication information associated with the user from the session cookie; and sending the request and the authentication information to the first application.

10. The computer-implemented method of claim 9, wherein the session cookie includes a load balancer identifier associated with the identity-aware load balancer such that if the request is received by a different load balancer it is forwarded to the identity-aware load balancer for processing.

11. A system comprising:

one or more applications implemented by a first one or more electronic devices; and an identity-aware load balancer implemented by a second one or more electronic devices, the identity-aware load balancer managing traffic directed to the one or more applications and the identity-aware load balancer including instructions that upon execution cause the identity-aware load balancer to:

receive a request destined to a first application of one or more applications;

inspect the request to determine whether the request includes a session cookie, the session cookie representing an authenticated state of a user, the authenticated state of the user determined by an identity provider and received by the identity-aware load balancer;

determine the request does not include the session cookie;

send a request to the identity provider to authenticate the user, the request to the identity provider generated using an authentication configuration associated with the first application;

receive authentication information for the user from the identity provider;

generate the session cookie including the authentication information;

redirecting a client device to resend the request to the first application including the session cookie; and process the request based on the authenticated state of the user.

12. The system of claim 11, wherein to process the request based on the authenticated state of the user, the instructions when executed further cause the identity-aware load balancer to:

decrypt the session cookie;

determine the session cookie is valid; and send the request to the first application.

13. The system of claim 11, wherein to process the request based on the authenticated state of the user, the instructions when executed further cause the identity-aware load balancer to:

determine the session cookie is expired;

send a request to the identity provider to authenticate the user, the request to the identity provider generated using an authentication configuration associated with the first application;

receive authentication information for the user from the identity provider;

generate a new session cookie including the authentication information; and redirect a client device to resend the request to the first application including the session cookie.

14. The system of claim 11, wherein the authentication configuration includes an issuer URI, an authorization endpoint URI, a token endpoint URI, a user information endpoint URI, and application credentials for the identity provider.

15. The system of claim 14, wherein the authentication configuration further includes at least one of a logout URI, authentication request extra parameters, or an on unauthenticated request field.

16. The system of claim 15, wherein the authentication configuration further includes a session cookie name, wherein the session cookie name is associated with the first application and a second application, and wherein logging out of the first application causes a client device of the user to be redirected to the logout URI, the session cookie to be invalidated, and the user logged out of the first application and the second application.

17. The system of claim 11, wherein the identity-aware load balancer comprises a plurality of nodes, each node of the plurality of nodes configured to decrypt the session cookie to retrieve authentication information associated with the user.

* * * * *